US012601665B2

(12) United States Patent
Yeh et al.

(10) Patent No.: US 12,601,665 B2
(45) Date of Patent: Apr. 14, 2026

(54) MEASURING METHOD OF LIQUID MIXTURE PURITY AND APPARATUS FOR MEASURING LIQUID MIXTURE PURITY

(71) Applicant: 3S SILICON TECH, INC., Hsinchu County (TW)

(72) Inventors: Kuo-Liang Yeh, Hsinchu County (TW); Ya-Ju Chang, Hsinchu County (TW); Jung-Kuei Peng, Hsinchu County (TW); Sheng-Tang Chang, Hsinchu County (TW); Min-Wen Weng, Hsinchu County (TW); Wen-Ting Huang, Hsinchu County (TW)

(73) Assignee: 3S SILICON TECH, INC., Hsinchu County (TW)

( * ) Notice: Subject to any disclaimer, the term of this patent is extended or adjusted under 35 U.S.C. 154(b) by 431 days.

(21) Appl. No.: 18/298,691

(22) Filed: Apr. 11, 2023

(65) Prior Publication Data

US 2024/0077392 A1 Mar. 7, 2024

(30) Foreign Application Priority Data

Sep. 6, 2022 (TW) .................................. 111133772

(51) Int. Cl.
*G01N 1/44* (2006.01)
(52) U.S. Cl.
CPC ...................................... *G01N 1/44* (2013.01)
(58) Field of Classification Search
CPC . G01N 1/44; G01N 7/16; G01K 13/00; G01L 11/00
See application file for complete search history.

(56) References Cited

U.S. PATENT DOCUMENTS

| | | | | |
|---|---|---|---|---|
| 4,395,903 A | * | 8/1983 | Gouw | G01N 25/14 |
| | | | | 73/64.45 |
| 2014/0190245 A1 | * | 7/2014 | Rafferty | H01J 49/04 |
| | | | | 73/864.81 |

FOREIGN PATENT DOCUMENTS

| | | | | | |
|---|---|---|---|---|---|
| JP | 2013133542 A | * | 7/2013 | ............... | G01N 1/02 |
| TW | I715161 B | * | 1/2021 | ............... | B23K 3/00 |
| WO | WO-2022181885 A1 | * | 9/2022 | ........... | C23C 16/448 |

* cited by examiner

*Primary Examiner* — Francis C Gray

(74) *Attorney, Agent, or Firm* — CKC & Partners Co., LLC

(57) ABSTRACT

According to the present disclosure, a measuring method of liquid mixture purity includes steps as follows. A storage tank is provided, wherein the storage tank is configured for storing a liquid mixture including formic acid and water. A calculating unit is provided, wherein a plurality of formic acid purity values are saved in the calculating unit. A pressure-decreasing and heating step is performed by reducing a pressure of the storage tank and heating the storage tank. A measuring step is performed by measuring in the inner space of the storage tank to obtain a pressure value, and measuring the liquid mixture simultaneously to obtain a temperature value. A calculating step is performed by inputting the pressure value and the temperature value into the calculating unit, wherein the calculating unit outputs one of the formic acid purity values corresponding thereto.

15 Claims, 3 Drawing Sheets

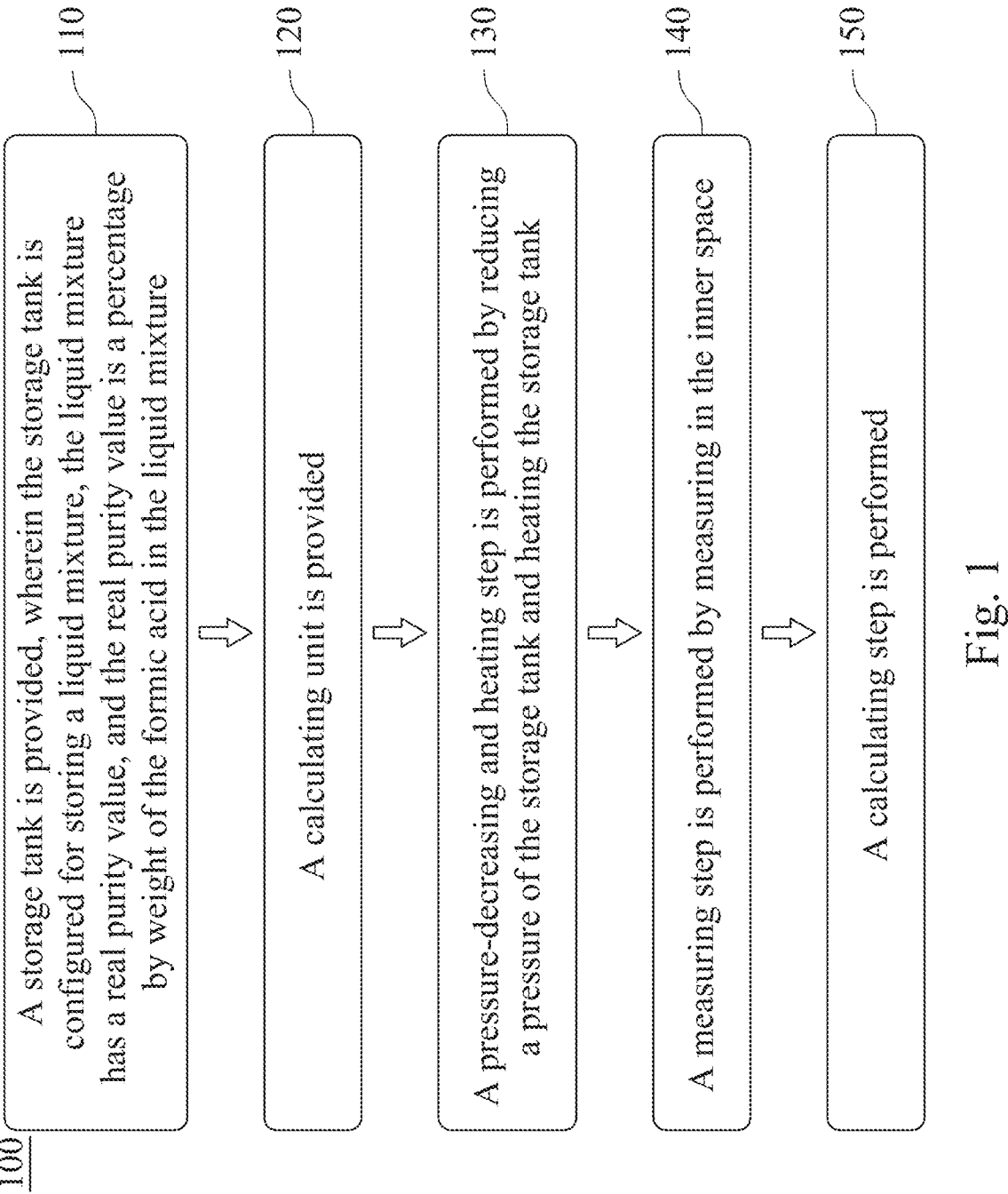

100

110 A storage tank is provided, wherein the storage tank is configured for storing a liquid mixture, the liquid mixture has a real purity value, and the real purity value is a percentage by weight of the formic acid in the liquid mixture 120 A calculating unit is provided 130 A pressure-decreasing and heating step is performed by reducing a pressure of the storage tank and heating the storage tank 140 A measuring step is performed by measuring in the inner space 150 A calculating step is performed

Fig. 1

MEASURING METHOD OF LIQUID MIXTURE PURITY AND APPARATUS FOR MEASURING LIQUID MIXTURE PURITY

RELATED APPLICATIONS

This application claims priority to Taiwan Application Serial Number 111133772, filed Sep. 6, 2022, which is herein incorporated by reference.

BACKGROUND

Technical Field

The present disclosure relates to a measuring method of liquid purity. More particularly, the present disclosure relates to a measuring method of liquid mixture purity which includes formic acid.

Description of Related Art

Formic acid is a widely used chemical material, which can be a material for products such as bactericides, detergents, artificial flavors or fuel cells, and can also be used for leather production, textile dyeing, rubber production, metal soldering and other industrial processes. Formic acid is usually stored in the storage tank in a liquid state. The liquid formic acid can be directly output from the storage tank for use. Also, the air in the storage tank can be removed by evacuating the storage tank, and then the formic acid vapor can be obtained for following processing.

However, formic acid is prone to breaking down into carbon monoxide and water in storage. The purity of formic acid in the storage tank will decrease gradually, which affects the manufacturing or processing results. For example, formic acid can be used as the flux during soldering. When soldering metal workpieces, formic acid vapor first contacts the surfaces of the workpieces. The metal oxide on the surfaces of the workpieces will form metal formates, which is further reduced to metal at high temperature to enhance the soldering strength. If the purity of the formic acid vapor is insufficient, metal oxides may still remain on the surfaces of the workpieces, which reduces the strength at the soldered region and results in non-soldering.

In order to know the purity of formic acid, the formic acid liquid in the storage tank should be obtained and analyzed by methods such as titration or gas chromatography. Therefore, the purity of formic acid cannot be known in real time, and there will be delays in the process because of waiting for analysis. Also, there is still a difference between the measured purity of formic acid and the actual purity of formic acid in use.

In this regard, it is still a problem to accurately measure the purity of formic acid in real time.

SUMMARY

According to one aspect of the present disclosure, a measuring method of liquid mixture purity includes steps as follows. A storage tank is provided, wherein the storage tank is configured for storing a liquid mixture, and the liquid mixture includes formic acid and water. A calculating unit is provided, wherein the calculating unit is coupled with the storage tank, and a plurality of formic acid purity values under different pressure and different temperature are saved in the calculating unit. A pressure-decreasing and heating step is performed by reducing a pressure of the storage tank and heating the storage tank to make an inner space of the storage tank become vacuum. A measuring step is performed by measuring in the inner space of the storage tank which is vacuum to obtain a pressure value, and measuring the liquid mixture simultaneously to obtain a temperature value. A calculating step is performed by inputting the pressure value and the temperature value into the calculating unit, wherein the calculating unit outputs one of the plurality of formic acid purity values corresponding to the pressure value and the temperature value. The liquid mixture has a real purity value, the real purity value is a percentage by weight of the formic acid in the liquid mixture, and the real purity value is larger than 85 wt. %.

According to another aspect of the present disclosure, an apparatus for measuring liquid mixture purity includes a storage tank, a calculating unit, a thermometer and a pressure gauge. The storage tank is configured for storing a liquid mixture, and the liquid mixture includes formic acid and water. The calculating unit is coupled with the storage tank, and a plurality of formic acid purity values under different pressure and different temperature are saved in the calculating unit. The thermometer is partially arranged in the storage tank, and the calculating unit is electrically or signally connected to the thermometer. The pressure gauge is partially arranged in the storage tank, and the calculating unit is electrically or signally connected to the pressure gauge. The pressure gauge measures in an inner space of the storage tank which is vacuum to obtain a pressure value, and the thermometer measures the liquid mixture simultaneously to obtain a temperature value. The pressure value and the temperature value are input into the calculating unit, and the calculating unit outputs one of the plurality of formic acid purity values corresponding to the pressure value and the temperature value. The liquid mixture has a real purity value, the real purity value is a percentage by weight of the formic acid in the liquid mixture, and the real purity value is larger than 85 wt. %.

BRIEF DESCRIPTION OF THE DRAWINGS

The present disclosure can be more fully understood by reading the following detailed description of the embodiment, with reference made to the accompanying drawings as follows:

FIG. 1 is a step flow chart of a measuring method of liquid mixture purity according to the present disclosure.

DETAILED DESCRIPTION

The present disclosure will be further exemplified by the following specific embodiments. However, the embodiments can be applied to various inventive concepts and can be embodied in various specific ranges. The specific embodiments are only for the purposes of description, and are not limited to these practical details thereof.

Figure 3:
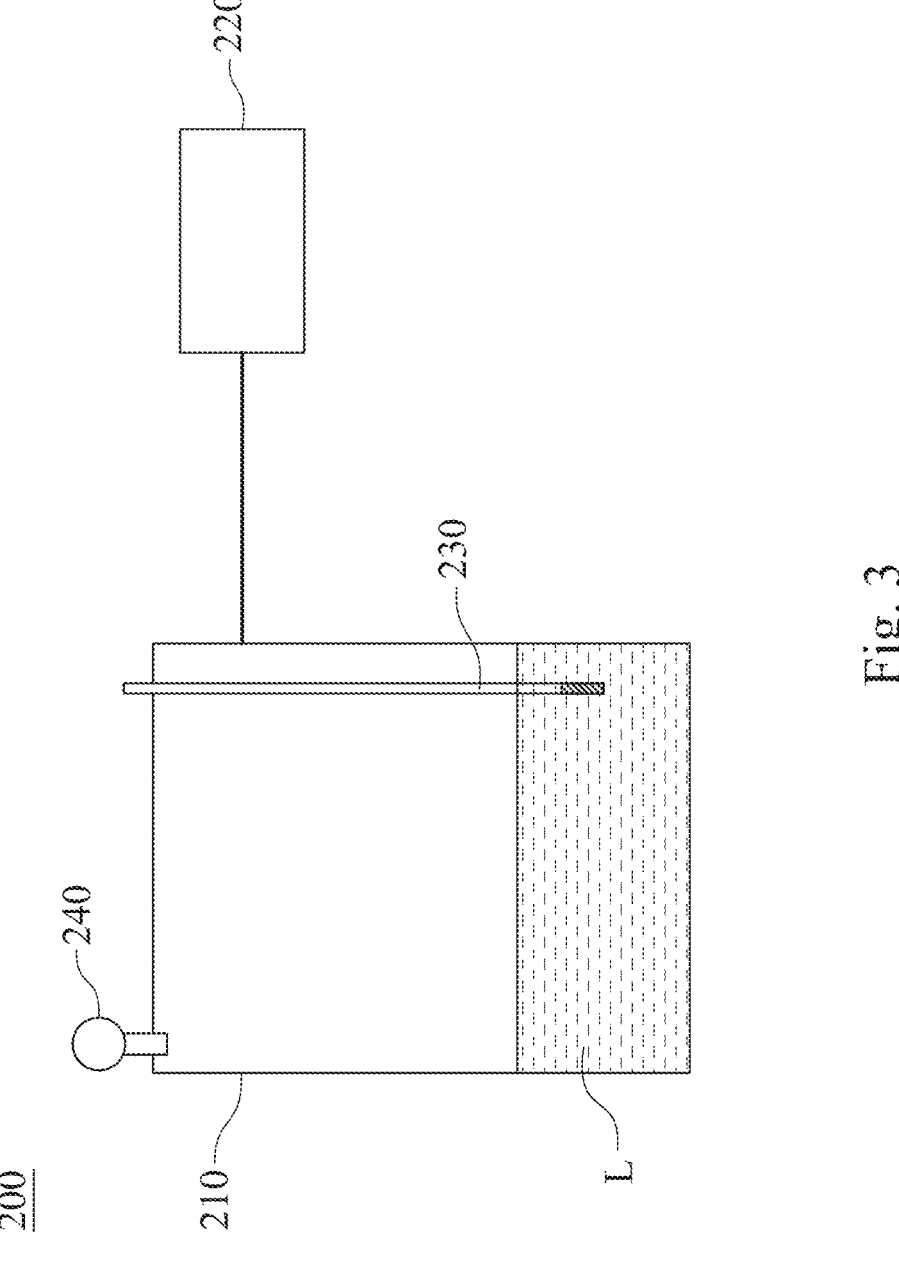
FIG. 3 is a cross-sectional schematic view of an apparatus for measuring liquid mixture purity according to the present disclosure.

FIG. 1 is a step flow chart of a measuring method of liquid mixture purity 100 according to the present disclosure. FIG. 3 is a cross-sectional schematic view of an apparatus for measuring liquid mixture purity 200 according to the present disclosure. According to one embodiment of the present disclosure, the measuring method of liquid mixture purity 100 includes Step 110, Step 120, Step 130, Step 140 and Step 150.

In Step 110, a storage tank 210 is provided, wherein the storage tank 210 is configured for storing a liquid mixture L, and the liquid mixture L includes formic acid and water. The liquid mixture L has a real purity value, the real purity value is a percentage by weight of the formic acid in the liquid mixture L, and the real purity value is larger than 85 wt. %. When the real purity value is relatively high, the change in vapor pressure of the formic acid as the purity changing is apparent, which is favorable for reducing the calculation error.

Moreover, the liquid mixture L can be consisting of the formic acid and the water, the real purity value can be larger than 95 wt. %, and a weight of the formic acid in the liquid mixture L can be 500 g to 4000 g. Because the temperature of the liquid mixture L may change in vaporization, the influences caused by temperature can be neglected when the weight of the formic acid is larger than 500 g, and the accuracy of measurement can be enhanced.

In Step 120, a calculating unit 220 is provided, wherein the calculating unit 220 is coupled with the storage tank 210, and a plurality of formic acid purity values under different pressure and different temperature are saved in the calculating unit 220. That is, there can be a certain formic acid purity value corresponding to the specific pressure and temperature, and the certain formic acid purity value is the theoretic percentage by weight of the formic acid in the liquid mixture L.

In detail, a thermometer 230 and a pressure gauge 240 can be partially arranged in the storage tank 210 for further measurement. The pressure gauge 240 measures in an inner space of the storage tank 210, and the thermometer 230 measures the liquid mixture L simultaneously. The calculating unit 220 can be electrically or signally connected to the thermometer 230 and the pressure gauge 240, so as to receive the measurement results of the thermometer 230 and the pressure gauge 240 for calculation. Furthermore, the calculating unit 220 can also be coupled with an output unit to send the calculation results to the output unit for operators to view. The detailed operation of the calculating unit 220 will be introduced in the following paragraphs, and the details will not be given herein.

In Step 130, a pressure-decreasing and heating step is performed by reducing a pressure of the storage tank 210 and heating the storage tank 210 to make the inner space of the storage tank 210 become vacuum. Through reducing the pressure in the storage tank 210, the air in the storage tank 210 can be removed to increase the concentration of formic acid vapor in the storage tank 210. Simultaneously, the liquid mixture L in the storage tank 210 can be heated to increase the temperature thereof, so as to make the concentration of formic acid vapor reaches the required concentration for further applications. In detail, different concentration of formic acid vapor is needed in different process. Thus, the inner space of the storage tank 210 can be heated to control the amount of vaporized formic acid from the liquid mixture L, so the concentration of formic acid vapor can be controlled to make sure that the concentration of formic acid vapor is enough for the manufacturing process.

In Step 140, a measuring step is performed by measuring in the inner space of the storage tank 210 which is vacuum to obtain a pressure value, and measuring the liquid mixture L simultaneously to obtain a temperature value. The temperature value can be 25° C. to 80° C. The inner space of the storage tank 210 and the liquid mixture L can be measured after waiting for an equilibrium time while performing the measuring step, and the equilibrium time can be 4 seconds to 3600 seconds. Therefore, the liquid mixture L and the formic acid vapor in the storage tank 210 can reach a balance so as to enhance the accuracy of measurement.

The pressure value obtained from the measuring step is mainly caused by the formic acid vapor and other gases besides formic acid. Therefore, the pressure value can include a partial pressure value of formic acid and a partial pressure value of non-formic acid, and the partial pressure value of formic acid can be 20 torr to 500 torr. The partial pressure value of non-formic acid can be less than 1 torr to reduce the potential error of measurement caused by other gases besides formic acid.

In Step 150, a calculating step is performed by inputting the pressure value and the temperature value into the calculating unit 220, wherein the calculating unit 220 outputs one of the plurality of formic acid purity values corresponding to the pressure value and the temperature value.

Figure 2B:
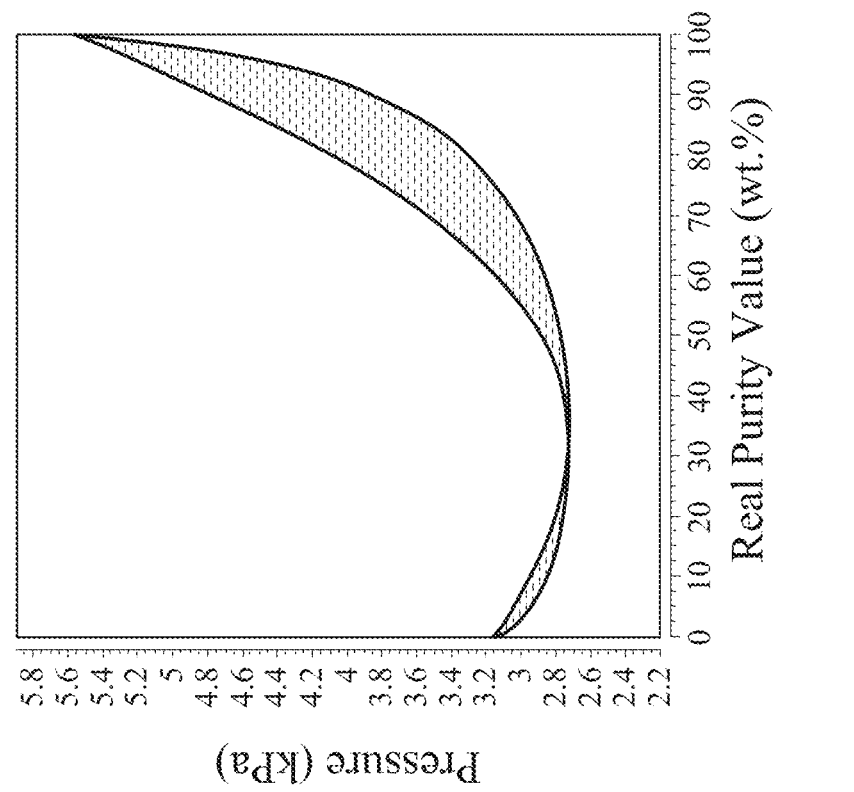
FIG. 2B is a relationship diagram between the real purity value of the liquid mixture and the pressure under room temperature.
Figure 2A:
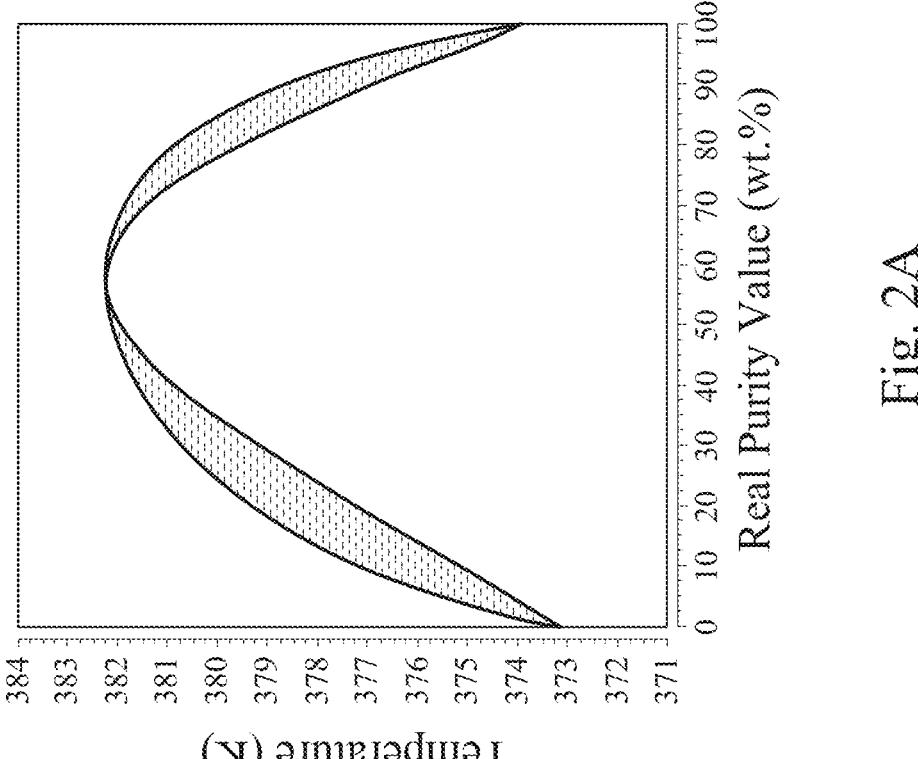
FIG. 2A is a relationship diagram between the real purity value of the liquid mixture and the temperature under atmospheric pressure.

FIG. 2A is a relationship diagram between the real purity value of the liquid mixture L and the temperature under atmospheric pressure. FIG. 2B is a relationship diagram between the real purity value of the liquid mixture L and the pressure under room temperature. In FIG. 2A and FIG. 2B, the formic acid purity value of the liquid mixture L can be calculated by measuring the vapor pressure of the formic acid vapor and the temperature of the liquid mixture L. In addition, the relationship of the formic acid purity value and the temperature under different pressure is different, and vice versa. Thus, the relationship curves of the formic acid purity value, the pressure value and the temperature value are built in the calculating unit 220, which is favorable for accurate calculation in real time.

It should be mentioned that, the error between the one of the plurality of formic acid purity values from the calculating step and the real purity value can be less than 1.0%. Therefore, it can prove that the measuring method of liquid mixture purity 100 of the present disclosure has relatively high accuracy.

In the following paragraphs, the measuring method of liquid mixture purity of the present disclosure is used for measuring the liquid mixtures with different purities, so as to understand whether the measuring method of liquid mixture purity of the present disclosure has great measuring accuracy or not.

The 1st example to the 5th example and the 1st comparative example are all liquid mixtures and the real purity values thereof are known. In the present experiment, the aforementioned liquid mixtures are measured and then the formic acid purity values thereof are calculated. The error of measurement thereof is also calculated. The real purity values and the measurement results of the 1st example to the 5th example and the 1st comparative example are listed in Table 1 below.

TABLE 1

| | Real Purity Value (wt. %) | Pressure Value (torr) | Temperature Value (° C.) | Formic Acid Purity Value (wt. %) | Error (%) | Average Error (%) |
|---|---|---|---|---|---|---|
| 1st Example | 98.0 | 55 | 28.7 | 98.09 | 0.09 | 0.084 |
| | | 71 | 34.9 | 97.99 | −0.01 | |
| | | 99 | 43.2 | 98.05 | 0.05 | |
| | | 114 | 47.2 | 97.90 | −0.10 | |

5

TABLE 1-continued

| Real Purity Value (wt. %) | Pressure Value (torr) | Temperature Value (° C.) | Formic Acid Purity Value (wt. %) | Error (%) | Average Error (%) |
|---|---|---|---|---|---|
| 2nd Example 94.0 | 49 | 31 | 93.83 | −0.18 | 0.156 |
| | 60 | 35.8 | 94.05 | 0.05 | |
| | 87 | 44.5 | 94.11 | 0.12 | |
| | 105 | 49.3 | 93.83 | −0.18 | |
| 3rd Example 92.3 | 45 | 30.6 | 92.15 | −0.16 | 0.239 |
| | 54 | 35.3 | 92.17 | −0.14 | |
| | 75 | 42.5 | 92.59 | 0.31 | |
| | 97 | 48.8 | 92.13 | −0.18 | |
| 4th Example 90.0 | 55 | 37.3 | 90.43 | 0.48 | 0.520 |
| | 72 | 43.9 | 89.57 | −0.48 | |
| | 93 | 49.1 | 90.32 | 0.36 | |
| 5th Example 86.0 | 45 | 34.6 | 86.75 | 0.87 | 0.940 |
| | 67 | 44.1 | 85.37 | −0.73 | |
| | 85 | 48.9 | 86.79 | 0.92 | |
| 1st Comparative Example 60.0 | 46 | 40.0 | 66.00 | 10.00 | 18.335 |
| | 123 | 60.0 | 76.00 | 26.67 | |

From Table 1, when the real purity value of the liquid mixture is larger than 85 wt. %, the error between the one of the plurality of formic acid purity values by the measuring method of liquid mixture purity of the present disclosure and the real purity value is less than 1.0% in average. When the real purity value of the liquid mixture is smaller than 85 wt. %, the error increases significantly. Therefore, the purity of the liquid mixture can be precisely measured by the measuring method of liquid mixture purity of the present disclosure.

In this regard, the pressure value and the temperature value can be calculated in real time because there is the calculating unit in the measuring method of liquid mixture purity of the present disclosure. The formic acid purity value of the liquid mixture can be rapidly obtained. By controlling the real purity value of the liquid mixture, the error caused by insufficient formic acid can be reduced, which is favorable for improving the analysis efficiency and accuracy.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A measuring method of liquid mixture purity, comprising:

providing a storage tank, wherein the storage tank is configured for storing a liquid mixture, and the liquid mixture comprises formic acid and water;

providing a calculating unit, wherein the calculating unit is coupled with the storage tank, and a plurality of formic acid purity values under different pressure and different temperature are saved in the calculating unit;

performing a pressure-decreasing and heating step by reducing a pressure of the storage tank and heating the storage tank to make an inner space of the storage tank become vacuum;

performing a measuring step by measuring in the inner space of the storage tank which is vacuum to obtain a pressure value, and measuring the liquid mixture simultaneously to obtain a temperature value; and performing a calculating step by inputting the pressure value and the temperature value into the calculating unit, wherein the calculating unit outputs one of the plurality of formic acid purity values corresponding to the pressure value and the temperature value;

wherein the liquid mixture has a real purity value, the real purity value is a percentage by weight of the formic acid in the liquid mixture, and the real purity value is larger than 85 wt. %.

2. The measuring method of liquid mixture purity of claim 1, wherein the liquid mixture is consisting of the formic acid and the water.

3. The measuring method of liquid mixture purity of claim 1, wherein the real purity value is larger than 95 wt. %.

4. The measuring method of liquid mixture purity of claim 1, wherein a weight of the formic acid in the liquid mixture is 500 g to 4000 g.

5. The measuring method of liquid mixture purity of claim 1, wherein the pressure value comprises a partial pressure value of formic acid and a partial pressure value of non-formic acid, and the pressure value is 20 torr to 500 torr.

6. The measuring method of liquid mixture purity of claim 1, wherein the temperature value is 25° C. to 80° C.

7. The measuring method of liquid mixture purity of claim 1, wherein an error is between the one of the plurality of formic acid purity values from the calculating step and the real purity value, and the error is less than 1.0%.

8. The measuring method of liquid mixture purity of claim 1, wherein the inner space of the storage tank and the liquid mixture are measured after waiting for an equilibrium time while performing the measuring step, and the equilibrium time is 4 seconds to 3600 seconds.

9. An apparatus for measuring liquid mixture purity, comprising:

a storage tank, wherein the storage tank is configured for storing a liquid mixture, and the liquid mixture comprises formic acid and water;

a calculating unit, wherein the calculating unit is coupled with the storage tank, and a plurality of formic acid purity values under different pressure and different temperature are saved in the calculating unit;

a thermometer, wherein the thermometer is partially arranged in the storage tank, and the calculating unit is electrically or signally connected to the thermometer; and a pressure gauge, wherein the pressure gauge is partially arranged in the storage tank, and the calculating unit is electrically or signally connected to the pressure gauge;

wherein the pressure gauge measures in an inner space of the storage tank which is vacuum to obtain a pressure value, and the thermometer measures the liquid mixture simultaneously to obtain a temperature value;

wherein the pressure value and the temperature value are input into the calculating unit, and the calculating unit outputs one of the plurality of formic acid purity values corresponding to the pressure value and the temperature value;

wherein the liquid mixture has a real purity value, the real purity value is a percentage by weight of the formic acid in the liquid mixture, and the real purity value is larger than 85 wt. %.

10. The apparatus for measuring liquid mixture purity of claim 9, wherein the liquid mixture is consisting of the formic acid and the water.

11. The apparatus for measuring liquid mixture purity of claim 9, wherein the real purity value is larger than 95 wt. %.

12. The apparatus for measuring liquid mixture purity of claim 9, wherein a weight of the formic acid in the liquid mixture is 500 g to 4000 g.

13. The apparatus for measuring liquid mixture purity of claim 9, wherein the pressure value comprises a partial pressure value of formic acid and a partial pressure value of non-formic acid, and the pressure value is torr to 500 torr.

14. The apparatus for measuring liquid mixture purity of claim 9, wherein the temperature value is 25° C. to 80° C.

15. The apparatus for measuring liquid mixture purity of claim 9, wherein an error is between the one of the plurality of formic acid purity values and the real purity value, and the error is less than 1.0%.

* * * * *